July 7, 1931. E. E. MILLER 1,812,973
BEARING ADJUSTING AND LOCKING DEVICE
Filed July 27, 1929
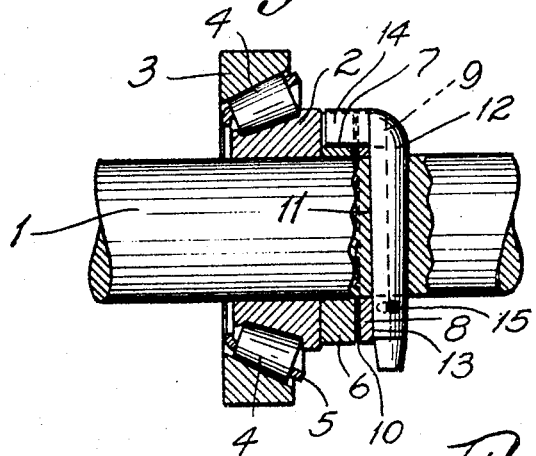
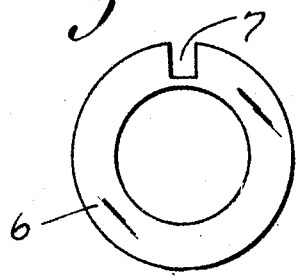
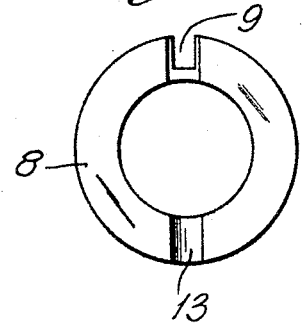
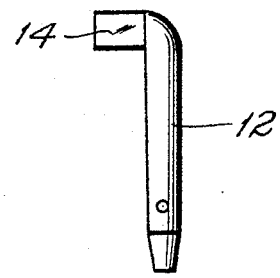
INVENTOR
Erwin E. Miller,
by Carr & Carr & Gravely,
HIS ATTORNEYS Patented July 7, 1931

1,812,973

UNITED STATES PATENT OFFICE

ERWIN E. MILLER, OF CANTON, OHIO, ASSIGNOR TO THE TIMKEN ROLLER BEARING COMPANY, OF CANTON, OHIO, A CORPORATION OF OHIO

BEARING ADJUSTING AND LOCKING DEVICE

Application filed July 27, 1929. Serial No. 381,585.

My invention relates to devices for adjusting and holding in proper position the parts of antifriction bearings; and it has for its principal object an adjusting and locking device for such bearings that is simple and inexpensive and that is adapted for use in places where it is not feasible to use a threaded nut or the like. The invention consists in the bearing adjusting and locking device and in the parts and combinations and arrangements of parts hereinafter described and claimed.

In the accompanying drawings,

Fig. 1 is a longitudinal sectional view of a shaft bearing and an adjusting and locking device therefor embodying my invention.

Fig. 2 is a detail view of one of the two washers forming part of the device, being the washer that abuts against the bearing, Fig. 3 is a detail view of the other washer, Fig. 4 is an edge view of said second washer, and Fig. 5 is a detail view of the locking pin.

The drawings illustrate a shaft 1 on which is mounted an antifriction bearing, the particular form of bearing illustrated in the drawings being a taper roller bearing comprising a cone or inner race member 2, a cup or outer race member 3 and conical rollers 4 therebetween held in a conical cage 5.

Abutting against the end of the bearing cone 2 is an annular washer 6 having a notch 7 in its periphery. Spaced slightly from said washer 6 is a second or outer washer 8 that is provided with a notch 9 in its periphery that alines with the notch 7 of the inner washer. Notched shims 10 are interposed between the two washers.

The shaft 1 is provided with a cross bore 11 through which extends a locking pin 12, both ends of which engage the outer washer 8. Preferably the outer washer is provided with diametrically spaced concave depressions 13 adapted to receive the locking pin 12.

The bearing is adjusted by placing the required number of shims 10 between the inner washer 6 and the outer washer 8 and then positioning and locking the outer washer by driving the locking pin 12 through the cross bore 11 of the shaft 1.

In order to prevent creeping of the washers or shims on the shaft which would result in wear of the shims, the locking pin 12 may be provided with a projecting dog 14 at one end that extends into the alined notches of the washers and shims. The locking pin may be held in place by means of a cotter pin 15 at the end opposite said dog 14.

The above construction dispenses with the threaded adjusting and locking devices commonly used and it is simple in construction and comparatively inexpensive to make. By preventing creeping and excessive wear of the shims, a great disadvantage of ordinary shim adjusting devices is obviated. If desired the locking pin and the shaft bore and washer depressions may be tapered.

What I claim is:

1. A device for adjusting and locking antifriction bearings including a race member, comprising a washer for abutting against said race member, an outer washer spaced slightly therefrom, shims interposed between said washers, a locking device engaging said outer washer to hold the parts in position, said locking device having a portion holding said shims and washers against rotation relative to each other.

2. A device for adjusting and locking antifriction bearings including a race member mounted on a shaft, comprising a washer for abutting against said race member, an outer washer spaced therefrom, shims interposed between said washers and a locking pin extending through a transverse bore provided therefor in said shaft and engaging said outer washer, said washers and said shims having alining notches and said locking pin having a projecting dog extending into said notches.

3. A device for adjusting and locking antifriction bearings including a race member mounted on a shaft, comprising a washer for abutting against said race member an outer washer spaced therefrom, shims interposed between said washers and a locking pin extending through a transverse bore provided therefor in said shaft and engaging said outer washer, said outer washer having diametrically spaced concave depressions adapted to receive said locking pin said washers and said shims having alining notches and said locking pin having a projecting dog extending into said notches.

Signed at Canton, Ohio, this 12th day of July, 1929.

ERWIN E. MILLER.